(12) United States Patent
Qiu et al.

(10) Patent No.: US 7,877,600 B2
(45) Date of Patent: Jan. 25, 2011

(54) METHOD AND APPARATUS FOR DISTRIBUTING ROOT CERTIFICATION

(75) Inventors: Xin Qiu, San Diego, CA (US); Petr Peterka, San Diego, CA (US); Eric J. Sprunk, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 931 days.

(21) Appl. No.: 11/616,348

(22) Filed: Dec. 27, 2006

(65) Prior Publication Data

US 2008/0162928 A1    Jul. 3, 2008

(51) Int. Cl.
*H04L 29/06* (2006.01)
*H04L 9/32* (2006.01)
*G06F 15/16* (2006.01)
*G06F 7/00* (2006.01)

(52) U.S. Cl. .................. 713/157; 713/156; 713/158; 726/10; 726/6

(58) Field of Classification Search ................. 713/157, 713/156, 158; 726/10, 6
See application file for complete search history.

(56) References Cited

U.S. PATENT DOCUMENTS 6,134,550 A * 10/2000 Van Oorschot et al. ......... 707/9

2004/0049675 A1    3/2004 Micali et al.
2005/0076205 A1*  4/2005 Thornton et al. ............ 713/156
2006/0143700 A1    6/2006 Herrmann
2006/0233363 A1   10/2006 Graunke

OTHER PUBLICATIONS

Load Balancing, WAN. In Microsoft Computer Dictionary. Microsoft Press 2002.*
Marchesini, John et al.: 'Virtual Hierarchies-An Architecture for Building and Maintaining Efficient and Resilient Trust Chains', in the Proceedings of the 7th Nordic Workshop on Secure IP Systems-NORDSEC 2002, published May 17, 2002, retrieved on Jun. 1, 2008) Retrieved from the Internet: <URL: http://www.cs.dartmouth.edu/~sws/pubs/ms02.pdf>,all pages.

* cited by examiner

*Primary Examiner*—Kambiz Zand
*Assistant Examiner*—Imhotep Durham

(57) ABSTRACT

An apparatus and method for providing at least one root certificate are disclosed. Specifically, a plurality of root certificates is received and stored. Afterwards, a request is received from a first endpoint device for a desired root certificate, where the desired root certificate is used by the first endpoint device to verify an identity of a second endpoint device. Furthermore, the first endpoint device and the second endpoint device are associated with different certificate hierarchies. The desired root certificate is then sent to at least the first endpoint device.

11 Claims, 3 Drawing Sheets

METHOD AND APPARATUS FOR DISTRIBUTING ROOT CERTIFICATION

BACKGROUND OF THE INVENTION

1. Field of the Invention

Embodiments of the present invention generally relate to cryptography, and in particular, to providing shared trust in a public network. More specifically, the present invention relates to a method and apparatus for securely distributing multiple trusts.

2. Description of the Related Art

In communicating, e.g., over the Internet, there will be instances where different users will want to communicate with each other for a variety of reasons. It is not uncommon for these users, however, to employ many different kinds of computers or other like communication devices. More specifically, there are instances where the devices used for communication by the different users vary in type or are associated with differing certificate hierarchies. For example, there are various devices originally deployed in closed and isolated environments that later need to be transferred to a generic, open, and shared network. Those devices that are fielded along with different trust chains and identities need to communicate with each other and with other entities on the Internet in real time. In order to securely communicate with each other, each device needs to be able to verify the identity of the device that it is communicating with. For instance, if digital content is to be transferred, the receiving device would need to obtain a root certificate of the sending device's issuer (i.e., root certificate authority). However, obtaining various root certificates over an expansive network in a secure manner (i.e., acquiring certificates with a high confidence that they are not changed, replaced, modified, etc.) is not without its problems. Namely it is difficult to authenticate the identity of users who are not certified by a common certificate authority.

Thus, there is a need in the art for an effective method and apparatus for securely distributing certificates.

SUMMARY OF THE INVENTION

In one embodiment, the present invention discloses an apparatus and a method for providing at least one root certificate. Specifically, a plurality of root certificates is received and stored. Afterwards, a request is received from a first endpoint device for a desired root certificate, where the desired root certificate is used by the first endpoint device to verify an identity of a second endpoint device. Furthermore, the first endpoint device and the second endpoint device are associated with different certificate hierarchies. The desired root certificate is then sent to at least the first endpoint device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 1:
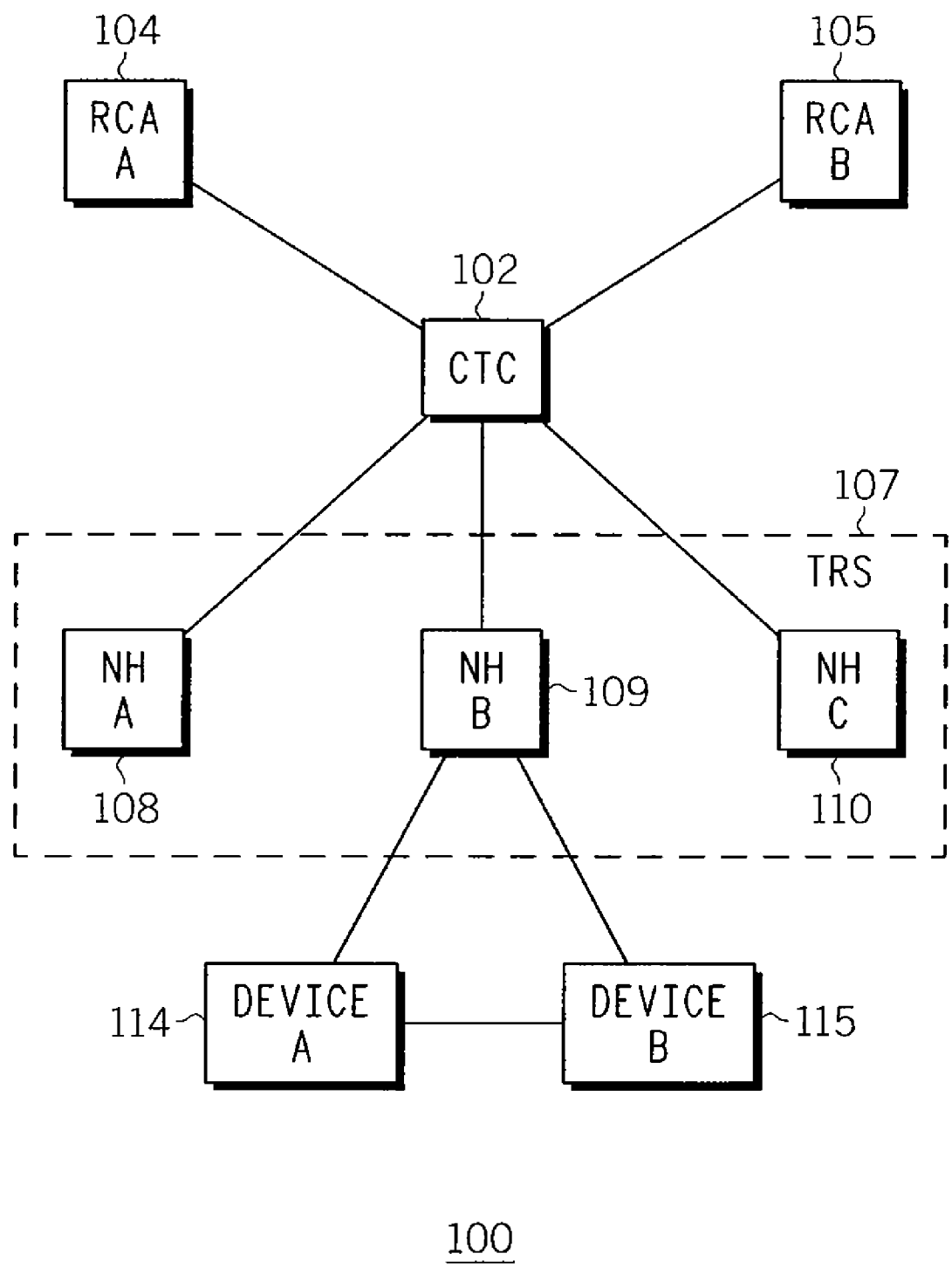
FIG. 1 depicts a block diagram of a system for facilitating distribution of multiple trusts over a communications network in accordance with the present invention.

FIG. 1 is a block diagram of a system 100 for accomplishing an embodiment of the invention. In one embodiment, the system 100 comprises a central trust controller (CTC) 102, a trust repository system (TRS) 107, a plurality of root certificate authorities (RCAs) 104-105, and a plurality of devices 114-115. In one embodiment, the TRS 107 comprises a plurality of network headends (NHs) 108-110 or servers. Although only two RCAs, two endpoint devices, and three NHs are depicted, those skilled in the art realize that any plurality of RCAs, endpoint devices, and NHs may be implemented in the system 100.

The CTC 102 is responsible for receiving certificates from the RCAs and subsequently distributing the data to the NHs. In one embodiment, the CTC 102 may comprise a network server that is responsible for receiving device certificates from a plurality of RCAs. For example, RCA 104 generates a CA certificate for Device A 114 and subsequently provides the certificate to the CTC 102.

As mentioned above, the TRS 107 comprises a plurality of network headends 108-110. The network headends may comprise network servers that are configured to receive root certificates that are globally pushed down by the CTC 102. Namely, each of the network headends receives a copy of all of the root certificates provided by the CTC 102. This process is typically triggered after the CTC 102 is updated by an RCA with at least one new certificate.

The RCAs 104-105 are typically embodied as servers or other network nodes that are configured to issue or revoke certificates, which are necessary for facilitating the secure communication between endpoint devices. Notably, the RCAs 104 provide root certificates to the CTC, which ultimately pushes the root certificates to the TRS 107.

Figure 2:
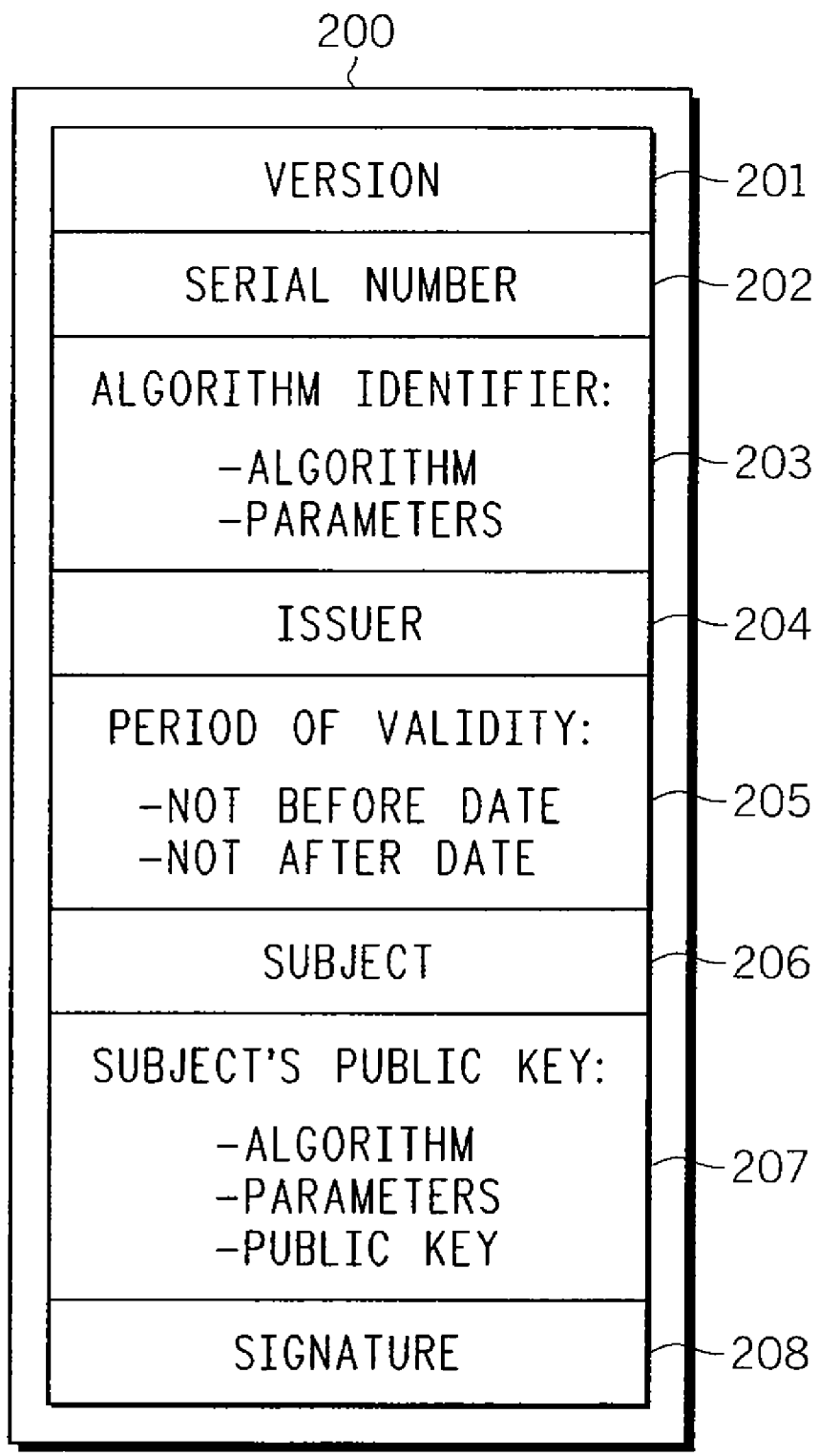
FIG. 2 depicts an example of a certificate granted by a certificate authority in accordance with the present invention.

In one embodiment, the root certificate may be embodied by the X.509 standard. Under this standard, each user (e.g., endpoint device) has a distinct name. A trusted certificate authority issues a signed certificate that certifies a user. For example, one exemplary certificate is shown in FIG. 2 as X.509 certificate 200. In this certificate, a version field 201 is provided to identify the certificate format. Furthermore, a serial number 202 is provided which is unique within the particular certificate authority issuing the certificate. The algorithm identifier field 203 is used to sign the certificate, together with any necessary parameters. The issuer field 204 is used to designate the name of the certifying authority. The period of validity field 205 is shown using a pair of dates. The certificate can be valid during the time period between these two dates. The subject field 206 can be used to indicate the name of the user. The subject's public key field 207 can be used to hold information such as the algorithm name, e.g., RSA, any necessary parameters, and the public key. The signature field 208 is used to provide the certificate authority's digital signature. The X.509 certificates, for example, can be stored on databases throughout a network, such as the Internet. Users can send them to each other or receive them from one another. When a certificate expires it can be removed from any public directories or retained should a dispute arise later.

In addition to issuing certificates, an RCA may also revoke certificates. For example, a need for this can arise when the digital signature of an end user is compromised or the certificate authority's key has been compromised. Similarly, the certificate authority may simply decide that it no longer wants to certify the end user. Each certificate authority maintains a list of all revoked but unexpired certificates. Therefore, when an end user receives a new certificate from a party, the end user checks to see whether that particular certificate has been revoked. A database of revoked certificates on the network can be checked or alternatively a cached list of revoked certificates can be checked locally. Each certificate authority provides a list of revoked certificates as its own "certificate revocation list" (CRL).

Referring back to FIG. 1, the endpoint devices 114-115 may comprise any device that may be used to communicate within the network. Examples of endpoint devices may include, but are not limited to, a server, a personal computer (PC), a handheld mobile device, set-top box (STB), digital video recorder (DVR), portable media player (MPM) and the like. These endpoint devices are normally certified by a certificate authority (e.g., RCAs 104-105). In order to securely communicate with each other, endpoint devices 114-115 possess the root certificate (and the public key it contains) of the other device's issuer, or certificate authority.

Figure 3:
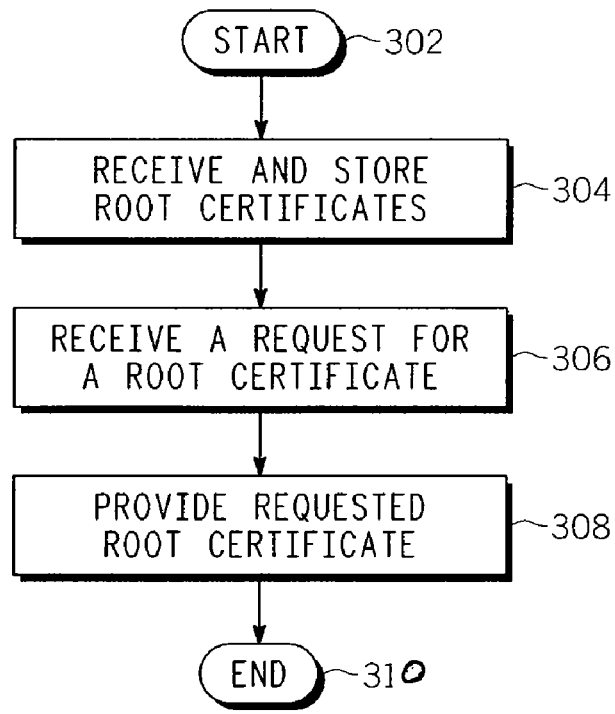
FIG. 3 depicts a method for distributing multiple trusts in accordance with the present invention.

FIG. 3 illustrates a method 300 for distributing multiple trusts in accordance with the present invention. In one embodiment, the present invention may be used to facilitate the seamless exchange of digital content that is protected by multiple digital rights management (DRM) systems. For example, suppose Device A uses a DRM system "X" with a corresponding certification hierarchy (e.g., a telephone using OMA DRM) and Device B utilizes a different DRM system "Y" with its own associated certification hierarchy (e.g., a set-top box (STB) or personal video recorder (PVR) that uses MediaCipher, Home Media Architecture (HMA), or Internet Protocol Rights Management (IPRM) system). A user then purchases digital content for Device A, which is protected by DRM system X. After Device A consumes the purchased digital content, the user may attempt to transfer the content from Device A to Device B. For example, this may be done by placing Device A and Device B in the same network so that the two devices may be connected via an interface. When this is initially done, the identity (i.e., certificate) of each device is passed to the other. However, although Device A and Device B exchange certificates, the two devices cannot respectively verify or recognize the other device's certificate (i.e., the device identity) because the devices do not have the corresponding root CA certificates. For instance, Device B (which is to receive content from Device A) may receive Device A's certificate, but cannot receive the digital content from Device A because Device B does not possess Device A's root CA's certificate that is necessary to verify or validate Device A's certificate. The certificate from Device A's issuer is required so that Device B is able to establish trust with Device A. Consequently, at least one of the devices must prompt the associated NH (e.g., NH B 109) to provide the necessary certificates.

Method 300 begins at step 302 and proceeds to step 304, where the root certificates from the RCAs are received by the TRS, e.g., received by the NHs. In one embodiment, the CTC 102 receives the root certificates periodically from both RCA A and RCA B, which are then forwarded to the TRS. This network provisioning step is typically conducted over private and trusted network links, which are established in order to securely deliver the root certificates to the CTC 102 and then to the TRS 107.

More specifically, the root certificates are provided to at least one NH server. In one embodiment, the CTC 102 provisions the network by conducting a "global push" wherein all of the certificates are "pushed" down to all of the NH servers 108-110 in the TRS 107. Notably, each NH server receives a copy of all of the provisioned root certificates. In one embodiment, this process is conducted every time the CTC 102 is updated (e.g., the CTC 102 receives a new root certificate). By receiving the root certificates in this manner, all of the NH servers are in possession of the certificates that are associated with each application that is supported by the network.

At step 306, method 300 receives a request for a root certificate, e.g., from one of the Devices A and B as discussed above. For example, a user may initially connect two Devices A and B for the purpose of passing multimedia content between the two Devices. When the Devices A and B are connected, the device identities are exchanged. In one embodiment, after the networking provisioning steps are completed, a user may desire to transfer content between two devices as described above. Before the transfer of digital content occurs, the identities of Device A and Device B along with their respective issuer's information (i.e., RCA A and RCA B) are exchanged via the transfer of device certificates. However, the Devices A and B may not possess the proper root certificate to verify each other's certificate, e.g., especially if the two Devices A and B have different certificate hierarchies. As such, at least one of the Devices A and B will forward a request, e.g., directed to one of the NHs, for a root certificate associated with the other device, where this request is received in step 306.

More specifically, in order to verify the identity of the sending device, trust must be established with the receiving device (and vice versa). In one embodiment, the receiving device establishes the requisite trust by obtaining the root certificate of the issuer (i.e., the RCA) associated with the sending device. If the receiving device possesses the necessary root certificate, then there is no need to send a request to obtain such root certificate. However, if the device's identity cannot be verified (i.e., the issuer is not trusted), then the method 300 will receive a request for the root certificate from the receiving device. Depending on the embodiment, the endpoint device is configured to generate and send the request without requiring a user's intervention. In other words, the receiving device can be preprogrammed to automatically seek out the proper root certificate for any devices that it is connected with. For example, this automated approach can be implemented as a network service in accordance with a user profile that is accessible by the network, or it can be implemented locally in the receiving device, where the automated routine is triggered whenever the receiving device is connected to a new device.

As such, a request is received from a device for the issuer's root certificate in step 306. In one embodiment, the device (e.g., Device B) makes a request to download Device A's issuer's root certificate from NH B 109 so that the device can verify the root certificate on its own. Alternatively, the device may instead request the validation of the issuer's certificate within the NH in the event the NH already possesses an instance of the desired root certificate. In one embodiment, network operators may enable this feature to be available to owners of the device on a selective basis.

At step 308, the root certificate is provided to the requesting device. In one embodiment, the NH pushes down the desired root certificate based on the request received from the device via a private and trusted link. Alternatively, if the device originally requested validation of the certificate, the NH may send a validation message to the requesting device. Afterwards, all subsequent communications between the Device A and Device B do not require the involvement of the NH B 109 again. The method 300 then ends at step 310.

Unlike other applications which use code downloads to distribute the certificates of new root certificate authorities that are added to the network, one embodiment of the present invention uses a mechanism that is based on the request from an endpoint device. Thus, the endpoint device does not have to wait for the code download event, which is typically only scheduled on a periodic basis. Instead, the communication between two different endpoint devices can be enabled immediately. Similarly, it is also easier to add a new CA instead of having to release code updates that could involve version control, testing, and backward compatibility issues. Therefore, even old and obsolete products may be supported. Another advantage of the present invention is that the download of certificates (or the validation message) to the requesting endpoint device is conducted on an as-needed basis. Therefore, network traffic and bandwidth demands are distributed and minimized.

Figure 4:
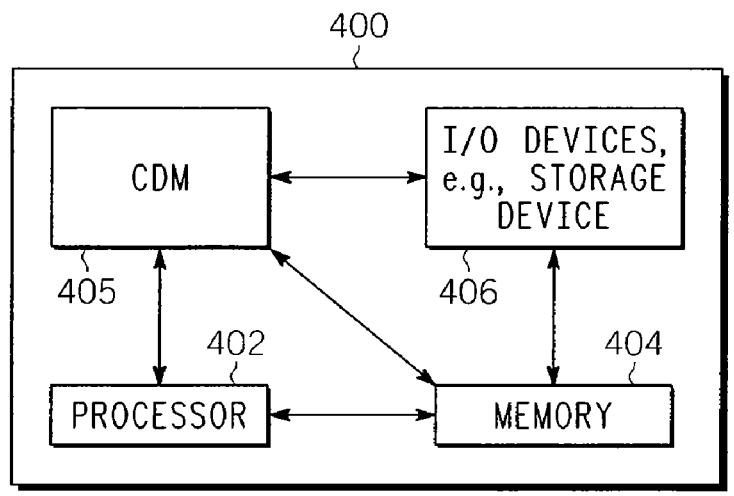
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM) and/or persistent memory (Flash), a certificate distribution module (CDM) 405, and various input/output devices 406 (e.g., storage devices, including but not limited to, a tape drive, a floppy drive, a hard disk drive, a compact disk drive, a receiver, a transmitter, a speaker, a display, a speech synthesizer, an output port, and a user input device (such as a keyboard, a keypad, a mouse, etc.) and the like.

It should be noted that the present invention can be implemented in software and/or in a combination of software and hardware, e.g., using application specific integrated circuits (ASIC), a general purpose computer or any other hardware equivalents. In one embodiment, the certificate distribution module or process 405 can be loaded into memory 404 and executed by processor 402 to implement the functions as discussed above. As such, the present certificate distribution module 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for providing at least one root certificate, comprising the steps of:
    storing a plurality of root certificates generated by a plurality of root certificate authorities, where at least two of said plurality of root certificate authorities are associated with different certificate hierarchies;
    receiving a request from a first endpoint device for a desired root certificate of a second endpoint device, wherein said desired root certificate is used by said first endpoint device to verify an identity of the second endpoint device, and wherein said first endpoint device and said second endpoint device are associated with different certificate authorities and different certificate hierarchies; and
    providing said desired root certificate to at least said first endpoint device, wherein said first endpoint device directly communicates with said second endpoint device after using said desired root certificate to validate said second endpoint device.

2. The method of claim 1, wherein said plurality of root certificates is stored by a plurality of network headends.

3. The method of claim 2, wherein at least one of said plurality of network headends comprises a server.

4. The method of claim 2, wherein both said first endpoint device and said second endpoint device are located in a same network as one of said plurality of network headends.

5. The method of claim 2, wherein said first endpoint device and said second endpoint device are located in different networks, where each of said different networks is served by one of said plurality of network headends.

6. The method of claim 1, wherein said plurality of root certificates is received from a central trust controller (CTC).

7. A system for providing at least one root certificate, comprising:
    at least one network headend for receiving and storing a plurality of root certificates generated by a plurality of root certificate authorities, where at least two of said plurality of root certificate authorities are associated with different certificate hierarchies; and
    a first endpoint device that submits a request to said at least one network headend for a desired root certificate of a second endpoint device, wherein said desired root certificate is used by said first endpoint device to verify an identity of the second endpoint device, and wherein said first endpoint device and said second endpoint device are associated with different certificate authorities and different certificate hierarchies,
    wherein the at least one network headend provides said desired root certificate to the first endpoint device, wherein said first endpoint device directly communicates with said second endpoint device after using said desired root certificate to validate said second endpoint device.

8. The system of claim 7, wherein said at least one network headend provides said desired root certificate to at least said first endpoint device.

9. The system of claim 7, wherein said at least one network headend comprises a server.

10. The system of claim 7, wherein both said first endpoint device and said second endpoint device are located in a same network as said at least one network headend.

11. The system of claim 7, wherein said first endpoint device and said second endpoint device are located in different networks, where each of said different networks is served by one of said plurality of network headends.

* * * * *